Feb. 14, 1939. R. L. KUSS 2,146,960
TANK CONSTRUCTION
Filed March 2, 1936   2 Sheets—Sheet 2
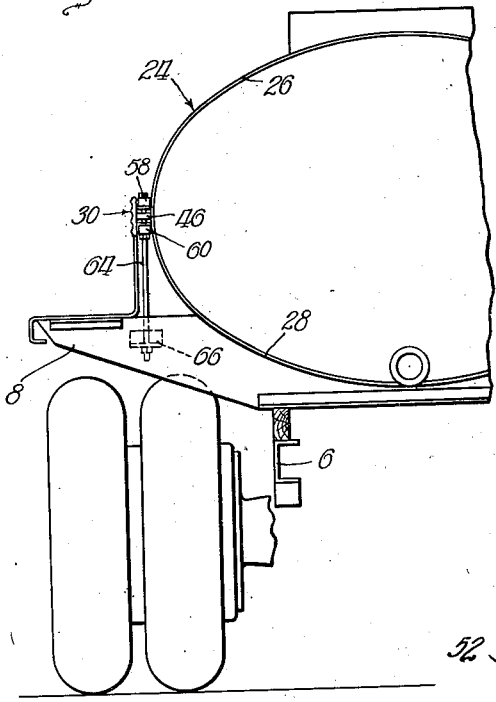
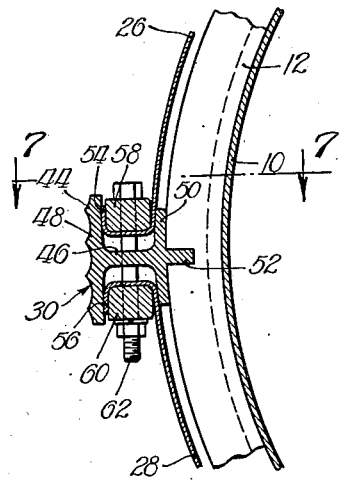
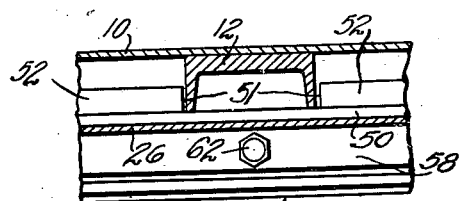
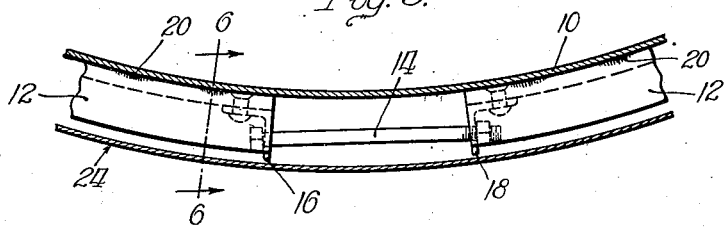
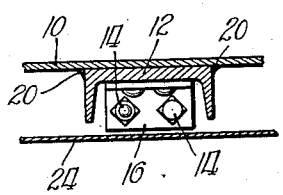
Inventor:
Ralph L. Kuss
By: Wilkinson, Huxley, Byron & Knight
Attys.

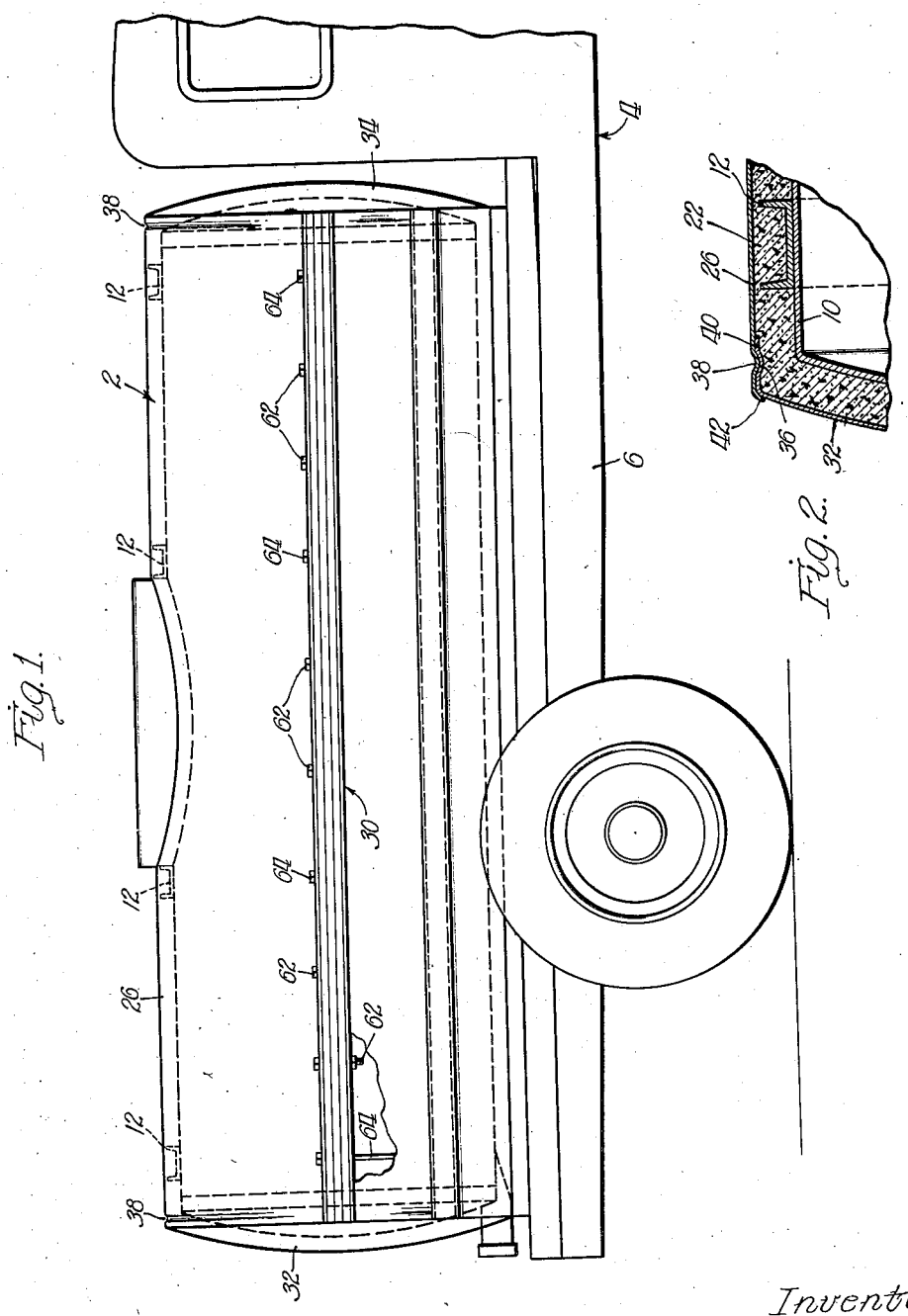

Patented Feb. 14, 1939

2,146,960

UNITED STATES PATENT OFFICE 2,146,960

TANK CONSTRUCTION

Ralph L. Kuss, Joliet, Ill., assignor to Farrell Manufacturing Company, Joliet, Ill., a corporation of Illinois Application March 2, 1936, Serial No. 66,671

13 Claims. (Cl. 280—5)

The present invention relates to tank constructions, and more particularly to tanks mounted on vehicles.

Among the objects of the present invention is to provide a tank of simple construction in which the parts may be manufactured economically and readily assembled and disassembled where it is necessary to repair or replace one or more of said parts thereof.

More particularly, the present invention comprehends a novel joint between a tank head and the shell, this joint being formed whereby the head, as well as the shell, may be removed as desired for repair or replacement without damaging either the head or the shell.

Another object of the present invention is to provide a novel joint between the head and shell of a tank, which joint is free from welding or the like, but which is tight to effectively prevent the ingress of dirt, water or other foreign materials.

Still another object of the present invention is to provide a novel joint between the head and shell or shell members of a tank, which joint is assembled by suitably drawing the edge portions of adjacent shell or shell members into tight engagement therewith.

The present invention also comprehends the idea of providing an improved joint between shell members which effectively holds the edge portions of adjacent shell members together to form a water-tight joint and which also serves as means for anchoring the tank to a support, as for example, the frame of a vehicle or the like.

Still another object within the purview of the present invention is to provide a novel joint between adjacent edge portions of lagging shell members, which joint is supported on reinforcing members for an inner tank shell and which serves as a clamp for drawing the edge portions of the lagging shell members together to provide a tight joint, this joint being so constructed and arranged that either one or both of the lagging shell members may be removed for repair or replacement without damage thereto. More particularly, this joint serves as a connection for means serving to hold the lagging shell, as well as the inner tank shell, in position on a support such as bolsters provided in a vehicle or the like.

Other objects, features, capabilities and advantages are comprehended by the invention, as will later appear and as are inherently possessed thereby.

Referring to the drawings:

Figure 1 is a fragmentary view in elevation of a vehicle having a tank made in accordance with the present invention mounted thereon;

Figure 2 is a fragmentary view in cross section showing the construction of the tank at the head portions thereof;

Figure 3 is a fragmentary view in end elevation of the tank and vehicle disclosed in Figure 1;

Figure 4 is a fragmentary transverse cross sectional view of the tank showing a joint formed in accordance with the present invention;

Figure 5 is a fragmentary view in vertical cross section through the tank adjacent one of the reinforcing members therefor;

Figure 6 is a fragmentary view in cross section taken in the plane represented by line 6—6 of Figure 5 of the drawings; and Figure 7 is a fragmentary view in cross-section taken in the plane represented by line 7—7 of Figure 4 of the drawings.

Referring now more in detail to the drawings, a tank 2 made in accordance with the present invention is disclosed as being mounted upon a vehicle or truck 4, the vehicle being provided with an underframe 6 upon which is mounted a plurality of transverse bolsters 8 forming a support for the tank 2. The tank 2 includes an inner tank shell 10 which may be of any desired material and which may be constructed in accordance with any desired design. This tank shell 10 is reinforced by means of a plurality of channel-shaped members 12 extending around the exterior of the tank 10 and which may be drawn into tight engagement with the tank 10 as by means of the bolts 14 connected to the angle irons 16 and 18 secured to the ends of these channel-shaped reinforcing members. After the channel members have been tightened in relation to the tank 10, the same may be fixed thereto as by means of spot welding or the like 20.

The inner tank shell 10 is preferably insulated by a layer of insulating material such as cork or the like 22, which insulating material extends around the entire surface of the tank shell 10 and is protected by lagging 24, which lagging includes a lagging shell 26 extending from the sides of the tank over the top thereof, and a lagging shell 28 which extends from the sides of the tank around the bottom thereof. Lagging shells 26 and 28 are secured together by joint structures 30 disposed on opposite sides of the tank and which will be described in detail hereinafter. The end surfaces of the insulating material 22 are protected by the lagging heads 32 and 34, each of which is secured to the lagging shells 26 and 28 in the same manner. The connections between the lagging heads 32 and 34 and lagging shells 26 and 28 include interengaging complementarily disposed swedge portions 36 and 38 in the form of depressions, the portions 36 being disposed on the flanges 40 which extend inwardly from the main part of the heads 32 and 34, and portions 38 being disposed on the lagging shells 26 and 28, which lagging shells embrace the flanges 40. The lagging shells 26 and 28 are further provided with flanges 42 extending over the main portion of the heads 32 adjacent the intersection thereof with the flanges 40.

In assembling the lagging for the tank, the heads 32 and 34 are placed in position over the insulating material 22, after which the lagging shells 26 and 28 are placed in position in embracing relation with the flanges 40 and the lagging shells 26 and 28 are then drawn into position by the joint assemblies 30 in order to securely hold the lagging heads and lagging shells in place to protect the insulating material.

The joints 30, as previously indicated, are disposed on each side of the tank and each is formed with a structural member or element 44 which has a central web 46 and spaced oppositely disposed flanges 48 and 50 formed on both sides of the web 46, substantially U-shaped channels formed by these flanges extending the entire length of the element or member. The member is substantially coextensive with the lagging shells 26 and 28 and the flange 50 thereof seats upon the reinforcing channel members 12. The member 44 is further provided with an inwardly extending web or flange 52 disposed laterally of the flange 50 and which is notched as at 61 at the reinforcing channels 12 to permit proper seating of the flange 50 therewith. The web 52 is in effect a reinforcing element and also serves to prevent longitudinal displacement of the structural element or member.

As shown in Figure 4 of the drawings, the edge portions 54 and 56 of the lagging shell members 26 and 28 are formed in the shape of a U having substantially the width of the U-shaped channels formed between the flanges 48 and 50 of the structural member 30. Disposed within the U-shaped end portions 54 and 56 are locking bars 58 and 60 extending the entire length of the tank, which locking bars are adapted to force these U-shaped ends of the lagging shell members 26 and 28 into wedging relation with the flanges 48 and 50. These end portions of the lagging shell members are drawn into tight engagement to form a water-tight joint with the locking bars and flanges 48 and 50 by means of a plurality of bolts 62 passing downwardly through the locking bars, lagging shell members and the central web 46 of the structural member 30. The locking bars are drawn together by tightening the bolts a sufficient amount to hold the lagging shell members in place and to provide a water-tight joint.

It will be readily apparent that when desired the lagging shell members may be removed for repair or replacement by loosening the bolts and withdrawing the ends of the members from the structural member 30. This can be done without injury or damage to the lagging shell members, and accordingly such lagging members may be used for great lengths of time.

In order to hold the tank in its proper operative position with respect to the frame 6 of the vehicle, tie bolts 64 may be provided, the same passing downwardly through the locking bars, structural member 30 and the lagging shell members, and being secured to angle brackets 66 which are connected to the bolsters 8 of the vehicle frame. By tightening these tie bolts 64, the tank can be tightly held in place without damage to the lagging shell member 28 or other of the elements of the vehicle tank.

While I have herein described and upon the drawings shown an illustrative embodiment of the invention, it is to be understood that the invention is not limited thereto but may comprehend other constructions, arrangements of parts, details and features without departing from the spirit of the invention.

I claim:

1. In a tank, the combination of adjacently disposed shell members, a structural element disposed adjacent the adjacent edges of said shell members, locking bars having seating relation with said structural element, the edge portions of said shell members being disposed between said locking bars and said structural element, and means for drawing said locking bars toward one another to interlock said shell members between said structural element and said locking bars and to provide a joint between said shell members.

2. In a vehicle, the combination of a vehicle frame, a tank disposed thereon, said tank including a shell comprising a plurality of members, a joint extending longitudinally of said tank for securing the edges of said shell members together, said joint comprising a structural element disposed adjacent the edges of said shell members, locking bars having seating relation with said structural element, the edge portions of said shell members being disposed between said locking bars and said structural element, means for drawing said locking bars toward one another to interlock said shell members between said structural element and said locking bars and to provide a tight joint, and means secured to said joint for holding said tank in place on said vehicle.

3. In a tank, the combination of adjacently disposed shell members, a joint for securing the edges of said shell members together, said joint comprising a structural element disposed adjacent said edges and having oppositely arranged channels, the edge portions of said members being disposed in said channels, and locking bars disposed in said channels whereby said edge portions are disposed between said locking bars and opposite walls forming said channels, and means for drawing said locking bars toward one another to provide a tight joint between said shell members.

4. In a vehicle, the combination of a vehicle frame, a tank disposed thereon, said tank including a shell comprising a plurality of members, a joint extending longitudinally of said tank for securing the edges of said shell members together, said joint comprising a structural element disposed adjacent said edges and having oppositely arranged channels, the edge portions of said members being disposed in said channels, and locking bars disposed in said channels whereby said edge portions are disposed between said locking bars and opposite walls forming said channels, means for drawing said locking bars toward one another to provide a tight joint between said shell members, and means secured to said joint and vehicle frame for holding said tank in place.

5. In a tank, the combination of adjacently disposed shell members, a joint for securing the edges of said shell members together, said joint comprising a structural element disposed between said edges and being formed with oppositely disposed substantially U-shaped channels, the edge portions of said shell members being substantially U-shaped and fitting within the channels of said structural element, locking bars disposed to cooperate with the U-shaped end portions of said shell members to hold the U-shaped end portions between the same and said structural element, and bolts through said locking members, shell members and structural element for drawing the edge portions of said shell members into tight engagement with said structural element.

6. In a tank, the combination of a tank shell, reinforcing members disposed thereon, a lagging shell disposed outwardly of said reinforcing members and comprising a plurality of shell members, a joint for securing the edges of adjacent shell members, said joint comprising a structural member having a centrally disposed web and spaced flanges providing oppositely disposed substantially U-shaped channels, one of said flanges seating on said reinforcing members, the edge portions of said shell members being substantially U-shaped and being disposed in said U-shaped channels, locking bars disposed in said U-shaped edge portions of said shell, and means for drawing said locking bars toward one another for holding said edge portions between the same and the sides of said channels.

7. In a tank, the combination of a tank shell, reinforcing members disposed thereon, a lagging shell disposed outwardly of said reinforcing members and comprising a plurality of shell members, a joint for securing the edges of adjacent shell members, said joint comprising a structural member having a centrally disposed web and spaced flanges providing oppositely disposed substantially U-shaped channels, one of said flanges seating on said reinforcing members, said structural member being further provided with a web extending laterally of one of said flanges and having notches to receive said reinforcing members to permit the seating of said structural member therewith, the edge portions of said shell members being substantially U-shaped and being disposed in said U-shaped channels, locking bars disposed in said U-shaped edge portions of said shell, and means for drawing said locking bars toward one another for holding said edge portions between the same and the sides of said channels.

8. In a vehicle, the combination of a frame, a tank shell, reinforcing members disposed thereon, a lagging shell disposed outwardly of said reinforcing members and comprising a plurality of shell members, a joint extending longitudinally of said tank for securing the edges of adjacent shell members, said joint comprising a structural member having a centrally disposed web and spaced flanges providing oppositely disposed substantially U-shaped channels, one of said flanges seating on said reinforcing members, the edge portions of said shell members being substantially U-shaped and being disposed in said U-shaped channels, locking bars disposed in said U-shaped edge portions of said shell, means for drawing said locking bars toward one another for holding said edge portions between the same and the sides of said channels, and means secured to said structural member and frame for securing said tank in place.

9. In a vehicle, the combination of a frame, a tank shell, reinforcing members disposed thereon, a lagging shell disposed outwardly of said reinforcing members and comprising a plurality of shell members, a joint extending longitudinally of said tank for securing the edges of adjacent shell members, said joint comprising a structural member having a centrally disposed web and spaced flanges providing oppositely disposed substantially U-shaped channels, one of said flanges seating on said reinforcing members, said structural member being further provided with a web extending laterally of one of said flanges and having notches to receive said reinforcing members to permit the seating of said structural member therewith, the edge portions of said shell members being substantially U-shaped and being disposed in said U-shaped channels, locking bars disposed in said U-shaped edge portions of said shell, means for drawing said locking bars toward one another for holding said edge portions between the same and the sides of said channels, and means secured to said structural member and frame for securing said tank in place.

10. In a tank construction, the combination of a support, a tank shell, reinforcing members therefor, a lagging shell comprising adjacently disposed shell members, means mounted on said reinforcing members and extending longitudinally of said tank for clamping the edge portions of adjacent shell members together, and means secured to said first-named means and said frame for securing said tank in position on said frame.

11. In a tank, the combination of adjacently disposed shell members, a structural element disposed adjacent the adjacent edges of said shell members, locking bars associated with said structural element, the edge portions of said shell members being disposed between said locking bars and said structural element, and means extending through said locking bars, edge portions of said shell and structural element for drawing said locking bars toward one another to interlock said shell members between said structural element and said locking bars and to provide a joint between said shell members.

12. In a vehicle, the combination of a vehicle frame, a tank disposed thereon, said tank including a shell comprising a plurality of members, a joint extending longitudinally of said tank for securing the edges of said shell members together, said joint comprising a structural element disposed adjacent the edges of said shell members, locking bars associated with said structural element, the edge portions of said shell members being disposed between said locking bars and said structural element, means extending through said locking bars, edge portions of said shell and structural element for drawing said locking bars toward one another to provide a joint between said shell members, and means secured to said joint for holding said tank in place on said vehicle.

13. In a tank, the combination of a tank shell, structural elements serving as reinforcing members disposed thereon, a lagging shell disposed outwardly of said structural elements and comprising a plurality of shell members, a joint for securing the edges of adjacent shell members, said joint comprising a structural element having a centrally disposed web and spaced flanges providing oppositely disposed substantially U-shaped channels, one of said flanges seating on said first-named structural elements, said last-named structural element being further provided with a web extending laterally of one of said flanges, said first and second-named structural elements being interlocked by said last-named web cooperating with said first-named structural elements, said cooperation being effected at the juncture of said last-named structural element with each of said first-named structural elements by a notch provided in one of said structural elements adapted to receive the other of said structural elements, the edge portions of said shell members being substantially U-shaped and being disposed in said U-shaped channels, locking bars disposed in said U-shaped edge portions of said shell, and means for drawing said locking bars toward one another for holding said edge portions between the same and the sides of said channels.

RALPH L. KUSS.